(12) United States Patent
Bond, III et al.

(10) Patent No.: US 6,659,572 B2
(45) Date of Patent: Dec. 9, 2003

(54) SYSTEM FOR EXERTING AN AMPLIFIED BRAKING FORCE

(75) Inventors: John Vincent Bond, III, Inkster, MI (US); Gerald H. Engelman, Plymouth, MI (US); M. Nabeel Tarabishy, Walled Lake, MI (US); Levasseur Tellis, Southfield, MI (US); Jonas Ekmark, Gothenburg (SE); Jonas Lars Zakarias Jansson, Gothenburg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/683,007

(22) Filed: Nov. 8, 2001

(65) Prior Publication Data

US 2003/0085617 A1 May 8, 2003

(51) Int. Cl.$^7$ .................................................. B60T 8/32
(52) U.S. Cl. ...................................... 303/193; 701/301
(58) Field of Search .................. 701/301, 96; 340/435, 340/436, 903; 180/167, 168, 169, 175; 303/193

(56) References Cited

U.S. PATENT DOCUMENTS

| | | | |
|---|---|---|---|
| 4,073,359 A | 2/1978 | Fujiki et al. | |
| 4,146,108 A | 3/1979 | Sato | |
| 5,278,764 A | 1/1994 | Iizuka et al. | |
| 5,420,792 A | 5/1995 | Butsuen et al. | |
| 5,467,284 A | 11/1995 | Yoshioka et al. | |
| 5,485,892 A | 1/1996 | Fujita | |
| 5,635,922 A | 6/1997 | Cho et al. | |
| 5,699,040 A | 12/1997 | Matsuda | |
| 5,924,508 A | 7/1999 | Clauss et al. | |
| 5,941,608 A | 8/1999 | Campau et al. | |
| 5,952,939 A | 9/1999 | Nakazawa et al. | |
| 6,021,375 A * | 2/2000 | Urai et al. | 701/301 |
| 6,070,682 A | 6/2000 | Isogai et al. | |
| 6,084,508 A | 7/2000 | Mai et al. | |
| 6,105,705 A | 8/2000 | Faye | |
| 6,131,063 A | 10/2000 | Seki et al. | |
| 6,189,987 B1 | 2/2001 | Shimizu | |
| 6,226,593 B1 | 5/2001 | Kurz et al. | |
| 6,275,772 B1 * | 8/2001 | Sugimoto et al. | 701/301 |
| 6,294,987 B1 * | 9/2001 | Matsuda et al. | 340/436 |
| 6,408,247 B1 * | 6/2002 | Ichikawa et al. | 701/301 |
| 6,415,230 B1 * | 7/2002 | Maruko et al. | 701/301 |

FOREIGN PATENT DOCUMENTS

| | | |
|---|---|---|
| DE | 198-17-326 A1 | 10/1999 |
| EP | 0-976-627 A1 | 2/2000 |

* cited by examiner

Primary Examiner—Matthew C. Graham
(74) Attorney, Agent, or Firm—Frank A. MacKenzie

(57) ABSTRACT

An emergency brake assist apparatus amplifies driver braking force upon imminent contact detection. A brake pedal, operated by the driver, exerts a pedal force upon a variable brake booster. A braking system is coupled to the variable brake booster that produces a variable brake booster force causing the braking system to exert a braking force proportional to the pedal force during normal operation. When a forward detection apparatus detects an imminent contact, a controller signals the variable brake booster to increase the variable brake booster force such that the braking system exerts an amplified braking force proportional to the pedal force.

15 Claims, 2 Drawing Sheets

SYSTEM FOR EXERTING AN AMPLIFIED BRAKING FORCE

BACKGROUND OF INVENTION

The present invention relates generally to brake systems for automotive vehicles, and more particularly, to an emergency brake assist system.

Automotive brake systems are the result of a long evolutionary process and are one of the most important systems in a vehicle. Typical brake systems include a master cylinder, located under the hood, which is directly connected to a brake pedal. The master cylinder converts mechanical pressure applied to the brake pedal into a proportional amount of hydraulic pressure. This hydraulic pressure is used to actuate the vehicle brakes. Many brake systems also use the engine's energy to add pressure to the master cylinder.

To improve upon standard braking systems, various automatic braking systems have been suggested in the prior art. U.S. Pat. No. 6,189,987 describes a brake force control apparatus which cannot generate an unnecessarily large brake force when an emergency brake is performed while a vehicle is traveling on a rough road or riding over a step.

The '987 patent is equipped with a fluid pressure generating mechanism, which generates an assist hydraulic pressure in which a pump is used as a fluid pressure source. The fluid pressure generating mechanism generates the assist hydraulic pressure based on a driving signal supplied from a control circuit. When the brake pedal is operated at a speed higher than a predetermined speed, the control circuit determines that an emergency braking is carried out by the driver, and outputs to the fluid pressure generating mechanism a drive signal which requests a maximum assist hydraulic pressure.

However, besides a situation in which the driver intentionally performs the emergency braking, the brake pedal may be pressed at a high speed if the vehicle is traveling on a rough road or the vehicle rides over a step on the road. According to the above conventional apparatus, the brake assist control is performed without exception when the brake pedal is depressed at a speed equal to or higher than the predetermined value irrespective of the vehicle traveling environment. Hence, the conventional apparatus may generate an unnecessarily large braking force when the vehicle is traveling on a rough road or passing a step.

Additionally, recent data indicates that some drivers do not apply all available braking force during emergency situations. This phenomenon occurs even when a collision is imminent. The system described in the '987 patent is still very reliant upon the actions of the driver.

The disadvantages associated with these conventional automatic emergency braking techniques have made it apparent that a new technique for automatic emergency braking is needed. The new technique should reduce crash energy in frontal collisions while enhancing driver performance. The present invention is directed to these ends.

SUMMARY OF INVENTION

It is, therefore, an object of the invention to provide an improved and reliable emergency brake assist system.

In accordance with the objects of this invention, an emergency brake assist apparatus amplifies driver braking force upon imminent contact detection. A brake pedal, operated by the driver, exerts a pedal force upon a variable brake booster. A braking system is coupled to the variable brake booster that produces a variable brake booster force causing the braking system to exert a braking force proportional to the pedal force during normal operation. When a forward detection apparatus detects an imminent contact, a controller signals the variable brake booster to increase the variable brake booster force such that the braking system exerts an amplified braking force proportional to the pedal force.

The present invention thus achieves an improved emergency brake assist system. The present invention is advantageous in that it enhances driver braking performance during imminent contact situations. Additionally, the present invention maintains prior art braking levels when an occupant is unbelted.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF DRAWINGS

In order that the invention may be well understood, there will now be described some embodiments thereof, given by way of example, reference being made to the accompanying drawings, in which.

DETAILED DESCRIPTION

Figure 1:
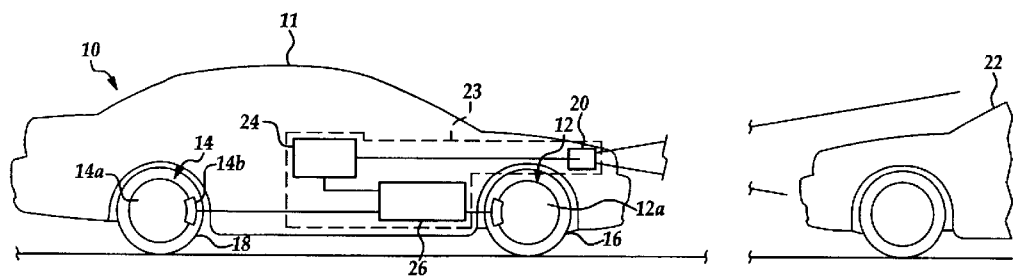
FIG. 1 is an emergency brake assist system in accordance with one embodiment of the present invention.

In the following figures, the same reference numerals will be used to identify identical components in the various views. The present invention is illustrated with respect to an emergency brake assist system, particularly suited for the automotive field. However, the present invention is applicable to various other uses that may require an emergency brake assist system.

Referring to FIG. 1, an emergency brake assist system 10 according to one embodiment of the present invention will be described. A vehicle 11 is provided with brake mechanisms 12 and 14 for front and rear wheels 16 and 18 respectively. In one aspect of the invention, brake mechanisms 12 and 14 comprise disc rotors 12a and 14a rotating with wheels 16 and 18, calipers 12b and 14b for braking the rotation of disc rotors 12a and 14a when hydraulic fluid for braking control is supplied. Further, vehicle 11 comprises a forward detection apparatus 20 for detecting the distance between the driving vehicle 11 and the vehicle ahead 22 by irradiating laser beams and the like. Vehicle 11 also includes an emergency brake assist apparatus 23 having a controller 24 receiving signals from the forward detection apparatus 20 and a braking system 26 for stopping vehicle 11.

The intention of the present invention is to mitigate or avoid imminent frontal contact by means of amplifying brake application. Interventions should only occur when the opportunity to steer away from the threat is passed. The algorithm to realize the present invention is based on estimation of probability of collision and is effective against moving as well as stationary objects. Preliminary efficiency estimations show that contact with low relative speed can be avoided; at higher relative speed, the contact speed may be significantly reduced.

Figure 2:
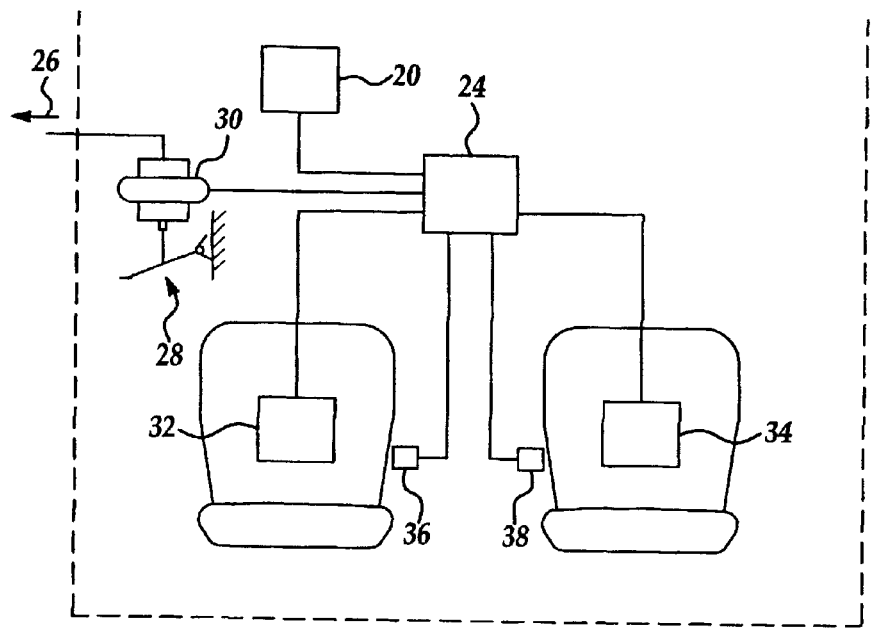
FIG. 2 is an emergency brake assist apparatus in accordance with one embodiment of the present invention.

Referring to FIG. 2, an emergency brake assist apparatus 23 according to one embodiment of the present invention will be described. A brake pedal 28, operated by the driver (not shown), exerts a pedal force upon a variable brake booster 30. The braking system 26 is coupled to the variable brake booster 30 that produces a variable brake booster force causing the braking system 26 to exert a braking force proportional to the pedal force. When a forward detection apparatus 20 detects an imminent contact, it notifies the driver of an imminent contact and signals controller 24. Controller 24 increases the variable brake booster force such that the braking system 26 exerts an amplified braking force proportional to the pedal force. Because the emergency brake assist apparatus amplifies driver braking force upon imminent contact indication, intervention will only be effective when the driver presses the brake pedal 28, and braking action can also still be modulated by the driver.

Amplifying brake force means using a modified characteristic for brake force vs. pedal force. In one aspect of the present invention, the brake force gain could, for example, be increased by a factor of four during imminent contact status.

In an alterative embodiment of the present invention, apparatus 23 includes a driver present switch 32, a passenger present switch 34, a driver seatbelt switch 36, and a passenger seatbelt switch 38. If the driver seatbelt switch 36 indicates that the driver is unbuckled, then apparatus 23 will not allow amplified braking force and will continue to operate as a prior art system. Likewise, if the passenger present switch 34 and the passenger seatbelt switch 38 indicate that a passenger is present and unbuckled, then apparatus 23 will not allow amplified braking force and will continue to operate as a prior art system.

The present invention requires a brake booster that has the ability to vary the gain of the brake pedal characteristic. Typically, this is only possible with electro-hydraulic or electro-mechanical brake systems. A conventional brake system with an electronically controlled active booster (i.e. Teves Mk25) does not offer similar functionality. In the latter case, the ability for the driver to control the deceleration continuously during active booster activation is lost. The reason is that pedal pressure cannot be measured accurately during booster activation. The automatic braking action must consequently be enabled/disabled by a so-called "release switch". This concept also implies that full braking power has to be applied during activation, because once the active booster is activated, the brake pedal pressure cannot be measured accurately any longer.

Figure 3:
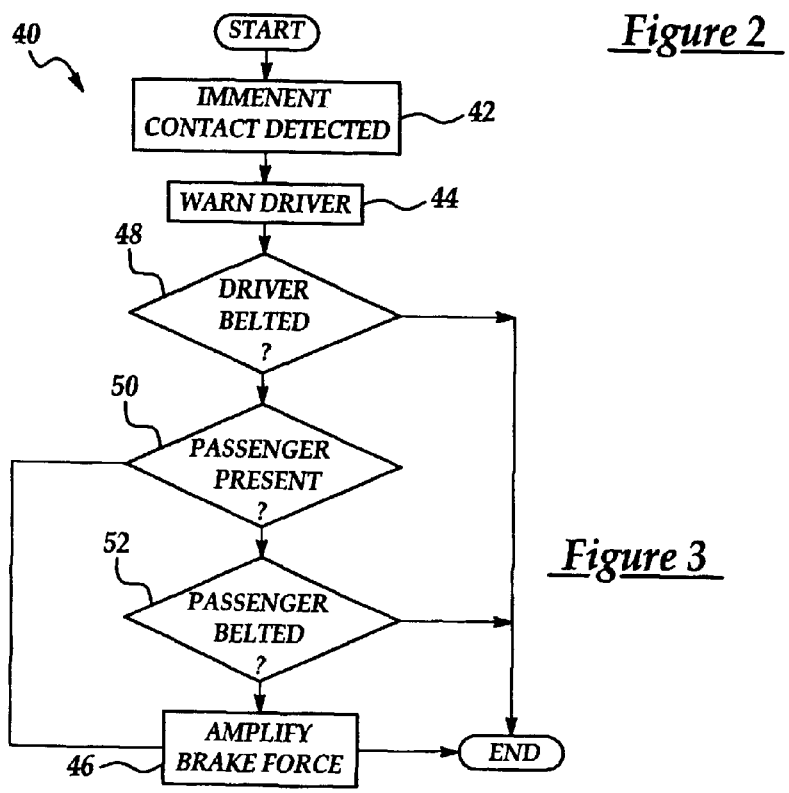
FIG. 3 depicts a flow chart of a method for providing emergency brake assistance in accordance with one embodiment of the present invention.

Referring to FIG. 3, a method for providing emergency brake assistance 40 in accordance with one embodiment of the present invention is illustrated. Method 40 begins with step 42 by detecting an imminent contact. Upon detection of an imminent contact the sequence proceeds to step 44 by notifying the driver of the imminent contact. This warning may include an audible signal or a visual signal, such as a telltale or head-up display. The sequence then proceeds to step 46, by increasing the variable brake booster force by a predetermined factor proportional to force applied to the brake pedal by the driver. The braking system 26 will then exert an amplified braking force proportional to the pedal force.

In an alternative embodiment of the present invention, method 40 also includes additional steps 48, 50, and 52 between steps 44 and 46. In step 48, the driver seatbelt status is determined. If the driver seatbelt is buckled, then the sequence proceeds to step 46 where amplified braking force is enabled. If the driver seatbelt is not buckled, then the sequence ends and amplified braking force is disabled. In step 50, the presence of a passenger may be reduced. If a passenger is not present, then the sequence proceeds to step 46 where amplified braking force is enabled. If a passenger is present, then the sequence proceeds to step 52. In step 52, the passenger seatbelt status is determined. If the passenger seatbelt is buckled, then the sequence proceeds to step 46 where amplified braking force is enabled. If the passenger seatbelt is not buckled, then the sequence ends and amplified braking force is disabled.

The method and system of the present invention reduces crash energy in frontal collisions by enhancing driver performance during imminent contact situations. Additionally, the present invention does not cause the passengers to be more susceptible to airbag related injuries.

From the foregoing, it can be seen that there has been brought to the art a new and improved emergency brake assist system. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. An emergency brake assist apparatus comprising:
    a brake pedal coupled to a variable brake booster, said brake pedal exerting a pedal force upon said variable brake booster;
    a braking system coupled to said variable brake booster, said variable brake booster producing a variable brake booster force, wherein said braking system exerts a braking force proportional to said pedal force during normal operation;
    a driver seatbelt switch operative to generate a driver unbuckled signal when a driver seatbelt is unbuckled;
    a forward detection apparatus having control logic operative to detect an imminent contact and generate an imminent contact signal; and
    a controller located in said vehicle and coupled to said variable brake booster, said driver seatbelt switch, and said forward collision detection apparatus, said controller including control logic operative to increase said variable brake booster force in response to said imminent contact signal, wherein said braking system exerts an amplified braking force proportional to said pedal force and reduces said amplified braking force when said driver seatbelt is unbuckled.

2. The emergency brake assist apparatus as recited in claim 1, wherein said variable brake booster comprises an electro-hydraulic brake booster.

3. The emergency brake assist apparatus as recited in claim 1, wherein said variable brake booster comprises an electromechanical brake booster.

4. The emergency brake assist apparatus as recited in claim 1, wherein said forward detection apparatus includes a forward contact warning apparatus, said forward contact warning apparatus operative to notify a driver of said imminent contact.

5. The emergency brake assist apparatus as recited in claim 1, further comprising a passenger present switch operative to generate a passenger present signal when a passenger is present in a passenger seat, said passenger present switch being coupled to said controller.

6. The emergency brake assist apparatus as recited in claim 5, further comprising a passenger seatbelt switch operative to generate a passenger unbuckled signal when a passenger seatbelt is unbuckled, said passenger seatbelt switch being coupled to said controller.

7. The emergency brake assist apparatus as recited in claim 6, wherein said controller includes control logic operative to reduce said amplified braking force when said passenger is present and said passenger seatbelt is unbuckled.

8. A method for providing emergency brake assistance comprising the steps of:

exerting a pedal force upon a variable brake booster;

generating a variable brake booster force, wherein a braking system exerts a braking force proportional to said pedal force during normal operation;

detecting an imminent contact;

increasing said variable brake booster force, wherein said braking system exerts an amplified braking force proportional to said pedal force; and reducing said amplified braking force when a driver seatbelt is unbuckled.

9. A method for providing emergency brake assistance as recited in claim 8 further comprising the step of reducing said amplified braking force when a passenger is present and a passenger seatbelt is unbuckled.

10. An emergency brake assist system comprising:

a vehicle having a brake pedal coupled to a variable brake booster, said brake pedal exerting a pedal force upon said variable brake booster;

a braking system located in said vehicle and coupled to said variable brake booster, said variable brake booster producing a variable brake booster force, wherein said braking system exerts a braking force proportional to said pedal force during normal operation;

a driver seatbelt switch operative to generate a driver unbuckled signal when a driver seatbelt is unbuckled;

a forward detection apparatus located in said vehicle and having control logic operative to detect an imminent contact and generate an imminent contact signal, said forward detection apparatus operative to notify a driver of said imminent contact; and a controller located in said vehicle and coupled to said variable brake booster, said driver seatbelt switch, and said forward collision detection apparatus, said controller including control logic operative to increase said variable brake booster force in response to said imminent contact signal, wherein said braking system exerts an amplified braking force proportional to said pedal force and reduces said amplified braking force when said driver seatbelt is unbuckled.

11. The emergency brake assist system as recited in claim 10, wherein said variable brake booster comprises an electro-hydraulic brake booster.

12. The emergency brake assist system as recited in claim 10, wherein said variable brake booster comprises an electro-mechanical brake booster.

13. The emergency brake assist system as recited in claim 10, further comprising a passenger present switch operative to generate a passenger present signal when a passenger is present in a passenger seat, said passenger present switch being coupled to said controller.

14. The emergency brake assist system as recited in claim 13, further comprising a passenger seatbelt switch operative to generate a passenger unbuckled signal when a passenger seatbelt is unbuckled, said passenger seatbelt switch being coupled to said controller.

15. The emergency brake assist system as recited in claim 14, wherein said controller includes control logic operative to reduce said amplified braking force when said passenger is present and said passenger seatbelt is unbuckled.

* * * * *